United States Patent
Wang et al.

(10) Patent No.: US 12,307,646 B2
(45) Date of Patent: May 20, 2025

(54) METHOD FOR IDENTIFYING WAFER

(71) Applicant: GlobalWafers Co., Ltd., Hsinchu (TW)

(72) Inventors: Shang-Chi Wang, Hsinchu (TW); Chia-Jung Lee, Hsinchu (TW); Bo-Ting Lin, Hsinchu (TW); Chia-Chi Tsai, Hsinchu (TW)

(73) Assignee: GlobalWafers Co., Ltd., Hsinchu (TW)

( * ) Notice: Subject to any disclaimer, the term of this patent is extended or adjusted under 35 U.S.C. 154(b) by 363 days.

(21) Appl. No.: 17/879,791

(22) Filed: Aug. 3, 2022

(65) Prior Publication Data

US 2023/0064159 A1    Mar. 2, 2023

(30) Foreign Application Priority Data

Sep. 1, 2021    (TW) ................................. 110132401

(51) Int. Cl.
*G06T 7/13*     (2017.01)
*G06T 7/00*     (2017.01)

(52) U.S. Cl.
CPC ............. *G06T 7/0004* (2013.01); *G06T 7/13* (2017.01); *G06T 2207/30148* (2013.01)

(58) Field of Classification Search
CPC ............. G06T 7/0004; G06T 7/13; G06T 2207/30148
USPC .................................................. 382/100, 149
See application file for complete search history.

(56) References Cited

U.S. PATENT DOCUMENTS

| | | | | |
|---|---|---|---|---|
| 5,091,963 | A * | 2/1992 | Litt ........................ | G06T 7/0004 382/199 |
| 6,167,150 | A * | 12/2000 | Michael ............... | G06V 10/457 382/199 |
| 6,493,645 | B1 * | 12/2002 | Hladschik .............. | H01L 22/12 702/182 |
| 7,162,073 | B1 * | 1/2007 | Akgul ................... | G06T 7/0004 356/73.1 |
| 7,855,088 | B2 * | 12/2010 | Akomer ................. | H01L 22/12 438/460 |
| 7,987,150 | B1 | 7/2011 | Luu et al. | |
| 2001/0054692 | A1 | 12/2001 | Nakada et al. | |
| 2004/0152233 | A1 * | 8/2004 | Nemets ................ | B23K 26/043 257/E23.179 |
| 2010/0037059 | A1 * | 2/2010 | Sun ..................... | H04N 1/32144 713/176 |
| 2020/0365685 | A1 | 11/2020 | Leonard et al. | |

FOREIGN PATENT DOCUMENTS

| | | |
|---|---|---|
| CN | 110889823 | 3/2020 |
| CN | 111447364 | 7/2020 |
| EP | 1278104 | 1/2003 |
| JP | 4118703 | 7/2008 |
| TW | I609177 | 12/2017 |
| WO | 2004019389 | 3/2004 |

* cited by examiner

*Primary Examiner* — Sheela C Chawan
(74) *Attorney, Agent, or Firm* — JCIPRNET (57) ABSTRACT

A method for identifying a wafer is provided, which includes the following steps. A marked frame is obtained from a wafer inspection picture. A gray scale index corresponding to the marked frame is calculated based on a gray scale value corresponding to each of multiple pixels included in the marked frame. The gray scale index indicates a proportion of pixels whose gray scale values are greater than a specified value. Whether a trace pattern in the marked frame is a scratch or a grain boundary is determined based on the gray scale index.

12 Claims, 9 Drawing Sheets

FIG. 10

METHOD FOR IDENTIFYING WAFER

CROSS-REFERENCE TO RELATED APPLICATION

This application claims the priority benefit of Taiwan application serial no. 110132401, filed on Sep. 1, 2021. The entirety of the above-mentioned patent application is hereby incorporated by reference herein and made a part of this specification.

BACKGROUND

Technical Field

The disclosure relates to a wafer analysis method, and in particular, to a method for identifying a wafer scratch and a grain boundary.

Description of Related Art

Wafer scratches and grain boundaries are common defects in semiconductor fabrication plants. A severe scratch may cause the entire pack of products to be scrapped. A conventional inspection machine cannot accurately distinguish between scratches and grain boundaries. It may be determined that the defects are all scratches, leading to additional rework time and cost on grain boundaries in further rough polishing and chemical mechanical polishing.

SUMMARY

The disclosure is directed to a method for identifying a wafer that is capable of accurately distinguishing between a grain boundary and a scratch.

A method for identifying a wafer of the disclosure includes the following. A marked frame is obtained from a wafer inspection picture. A gray scale index corresponding to the marked frame is calculated based on a gray scale value corresponding to each of multiple pixels included in the marked frame. The gray scale index indicates a proportion of pixels whose gray scale values are greater than a specified value. Whether a trace pattern in the marked frame is a scratch or a grain boundary is determined based on the gray scale index.

In an embodiment of the disclosure, the marked frame has a corresponding confidence index and a classification mark. After the marked frame is obtained from the wafer inspection picture, the method further includes the following. If the confidence index is greater than or equal to a confidence threshold, it is determined that the classification mark is correct. If the confidence index is less than the confidence threshold, the gray scale index corresponding to the marked frame is calculated and a threshold is set to determine whether the trace pattern is the scratch or the grain boundary.

In an embodiment of the disclosure, determining whether the trace pattern is the scratch or the grain boundary includes the following. Whether the gray scale index is greater than or equal to the threshold is determined. If the gray scale index is greater than or equal to the threshold, it is determined that the trace pattern is the scratch. If the gray scale index is less than the threshold, the trace pattern is identified in the marked frame and a slope difference index of the trace pattern is calculated. Whether the trace pattern is the scratch or the grain boundary is determined based on the gray scale index and the slope difference index.

In an embodiment of the disclosure, calculating the slope difference index of the trace pattern includes the following. A first end point, a second end point, and multiple target points are extracted from the trace pattern. A standard slope between the first end point and the second end point is calculated. Multiple comparison slopes are calculated based on two random points among the target points. The slope difference index is obtained based on the standard slope and the comparison slopes.

In an embodiment of the disclosure, in a process in which the slope difference index is obtained based on the standard slope and the comparison slopes, the slope difference index is calculated with the equation below:

$$Sct = \sum_{i=1}^{n} \frac{(Si - Sstd)/Sstd}{n},$$

n is a number of the comparison slopes, Si is an ith i=1 n comparison slope, i=1~n, Set is the slope difference index, and Sstd is the standard slope.

In an embodiment of the disclosure, determining whether the trace pattern is the scratch or the grain boundary based on the gray scale index and the slope difference index includes the following. A comprehensive index is obtained based on the gray scale index and the slope difference index. If the comprehensive index is greater than or equal to a predetermined value, it is determined that the trace pattern in the marked frame is the scratch. If the comprehensive index is less than the predetermined value, it is determined that the trace pattern in the marked frame is the grain boundary.

In an embodiment of the disclosure, the comprehensive index is obtained through the equation below: C=W1×G+W2×(1/S), C is the comprehensive index, G is the gray scale index, S is the slope difference index, and W1 and W2 are weight values.

A method for identifying a wafer of the disclosure includes the following. A marked frame is obtained from a wafer inspection picture. A gray scale index corresponding to the marked frame is calculated based on a gray scale value corresponding to each of multiple pixels included in the marked frame. The gray scale index indicates a proportion of pixels whose gray scale values are greater than a specified value. A trace pattern is identified in the marked frame and a slope difference index of the trace pattern is calculated. Whether the trace pattern in the marked frame is a scratch or a grain boundary is determined based on the gray scale index and the slope difference index.

Based on the above, in the disclosure, different characteristics of the grain boundary and the scratch are adopted to build an identification module, which can accurately distinguish between the grain boundary and the scratch, thereby reducing the chances of mistaking the grain boundary for the scratch and causing additional rework.

DESCRIPTION OF THE EMBODIMENTS

Figure 1:
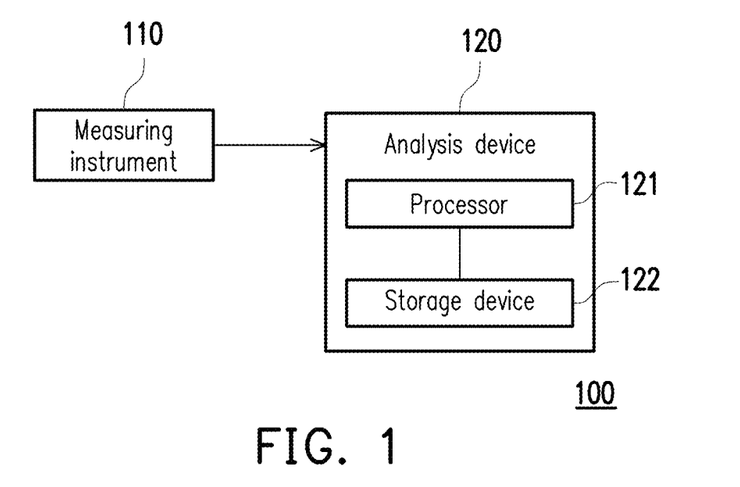
FIG. 1 is a block diagram of a wafer analysis system according to an embodiment of the disclosure.

FIG. 1 is a block diagram of a wafer analysis system according to an embodiment of the disclosure. A wafer analysis system 100 includes a measuring instrument 110 and an analysis device 120. The measuring instrument 110 may transmit data to the analysis device 120 in a wireless or a wired manner of transmission.

The measuring instrument 110 is, for example, an automated optical inspection (AOI) instrument. The AOI instrument is a high-speed and high-precision optical image inspection system including applications such as a measurement lens technology, an optical lighting technology, a positioning measurement technology, an electronic circuit testing technology, an image processing technology, an automation technology, and the like. The AOI instrument applies machine vision as a testing standard technology.

The analysis device 120 is an electronic device with a computing function and may be realized as a personal computer, a laptop computer, a tablet computer, a smartphone, or any devices with the computing function, and the disclosure is not limited thereto. The analysis device 120 includes a processor 121 and a storage device 122.

The processor 121 is, for example, a central processing unit (CPU), a physics processing unit (PPU), a programmable microprocessor, an embedded control chip, a digital signal processor (DSP), an application specific integrated circuit (ASIC), or other similar devices.

The storage device 122 is, for example, any type of fixed or mobile random access memory (RAM), read only memory (ROM), flash memory, hard disk, or other similar devices or the combination of the devices. The storage device 122 includes one or more program code segments, and after the program code segments are installed, the program code segments are executed by the processor 121.

Figure 2:
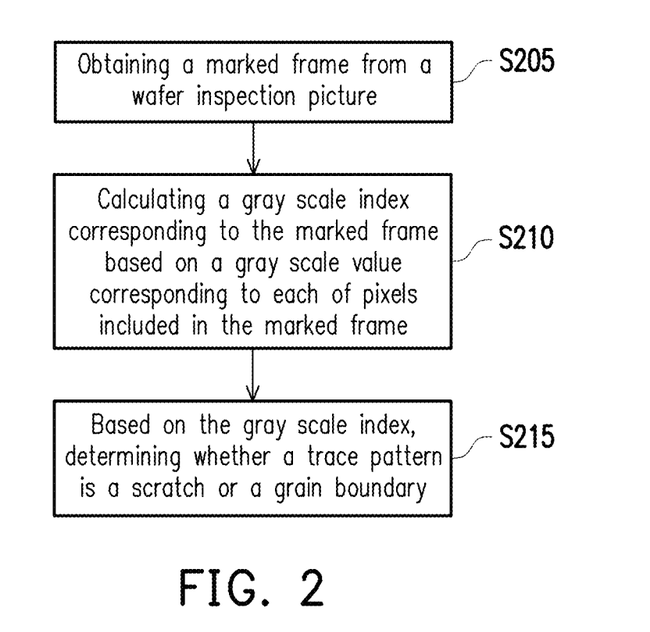
FIG. 2 is a flowchart of a method for distinguishing between a wafer scratch and a grain boundary according to an embodiment of the disclosure.

FIG. 2 is a flowchart of a method for identifying a wafer scratch according to an embodiment of the disclosure. Referring to FIG. 1 and FIG. 2, in step S205, a marked frame is obtained from a wafer inspection picture. In the embodiment, a frame selection is performed in the wafer inspection picture through the processor 121 to obtain one or more candidate frames. For example, the storage device 122 includes a LabelImg tool, and each of detected candidate frames has a corresponding confidence index and a classification mark. The confidence index is, for example, an intersection over union (IOU) value, and the classification mark is a grain boundary or a scratch.

Figure 3:
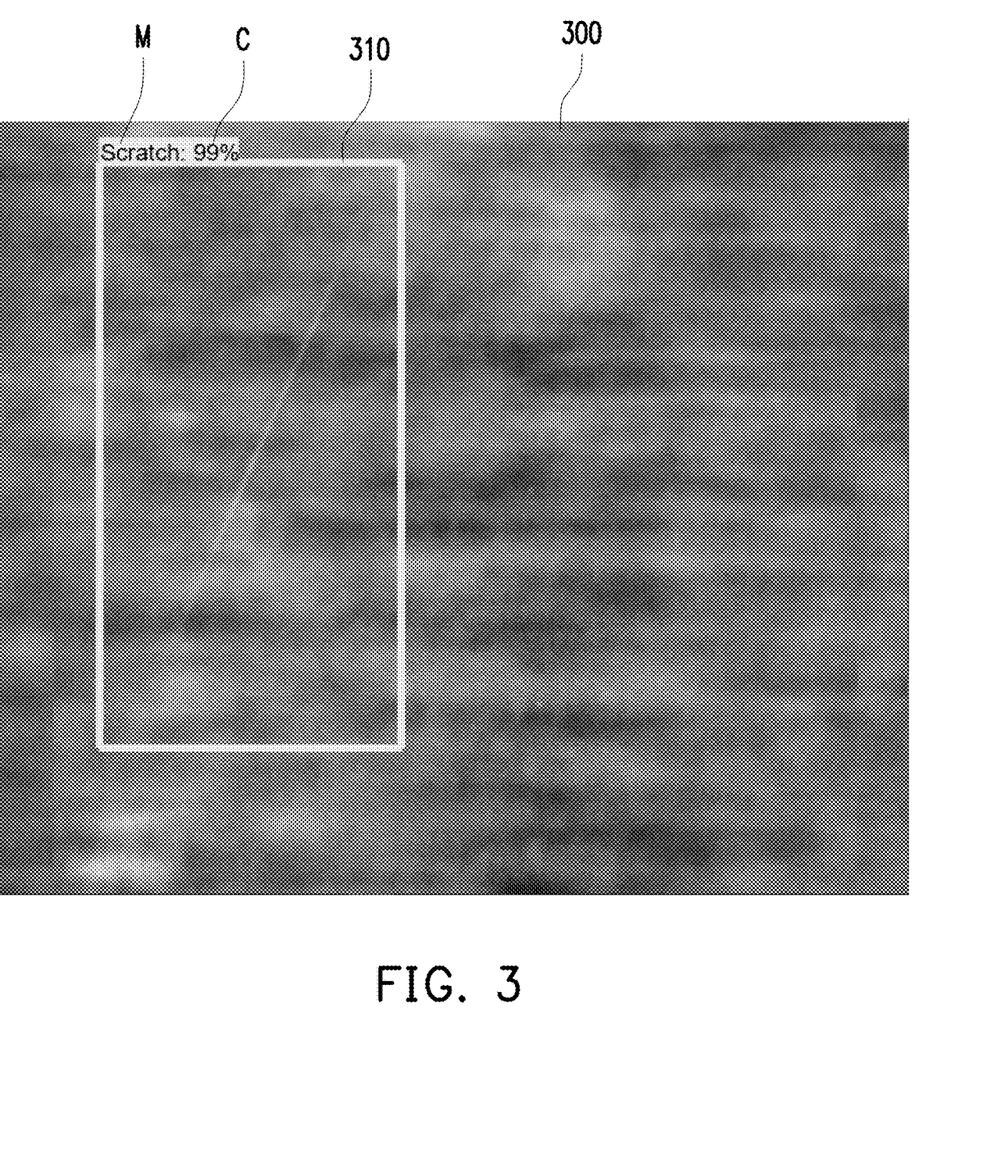
FIG. 3 is a schematic diagram of a wafer inspection picture according to an embodiment of the disclosure.

FIG. 3 is a schematic diagram of model determination of a wafer inspection picture according to an embodiment of the disclosure. Referring to FIG. 3, model determination obtained after determination performed on a wafer inspection picture 300 through an inspection model includes a marked frame 310. The marked frame 310 has a corresponding confidence index C and a classification mark M. When the model determination is trained, the IOU value represents, for example, a difference between actual data and a determination result of the marked frame. When a model is tested, the IOU value represents a union of a marked frame characteristic and a characteristic of a trained model determination. For example, the model determination of the disclosure may set an IOU threshold as 0.7. Candidate frames whose IOU values are less than 0.7 may be directly ignored without processing, and further processing is performed only on candidate frames whose IOU values are greater than or equal to 0.7. Here, the IOU threshold set as 0.7 is used only as an example. In other embodiments, the IOU value of the model determination may be adjusted according to requirements as a threshold, and the corresponding processing and determination mechanism may be adjusted accordingly; the disclosure is not limited thereto.

In a case where an inspection model of the wafer inspection picture 300 determines that 1 candidate frame is detected, the detected candidate frame directly serves as the marked frame. In a case where the number of the candidate frames detected by the inspection model is greater than 1, at least one of the candidate frames is selected as the marked frame according to the confidence index. For example, in a case where the number of the candidate frames is greater than 1, an overlap rate of every two candidate frames is determined, and at least one candidate frame is selected from the candidate frames as the marked frame according to the confidence index and the overlap rate.

For example, the multiple candidate frames are ranked in order of the confidence index from the greatest to the least, and a candidate frame with the greatest confidence index is selected as a first marked frame. Next, candidate frames whose overlap rates with the first marked frame are greater than a predetermined value (e.g. 60%) are deleted, and candidate frames whose overlap rate with the first marked frame are less than 60% are kept. Then, among the candidate frames that are kept, a candidate frame with the greatest confidence index is selected as a second marked frame. Next, candidate frames whose overlap rates with the second marked frame are greater than 60% are deleted, and candidate frames whose overlap rate with the second marked frame are less than 60% are kept. Then, among the candidate frames that are kept, a candidate frame with the greatest confidence index is selected as a third marked frame. Likewise, the steps above are repeated until the overlap rates of remaining candidate frames and a selected marked frame are not greater than 0.6.

Figure 4:
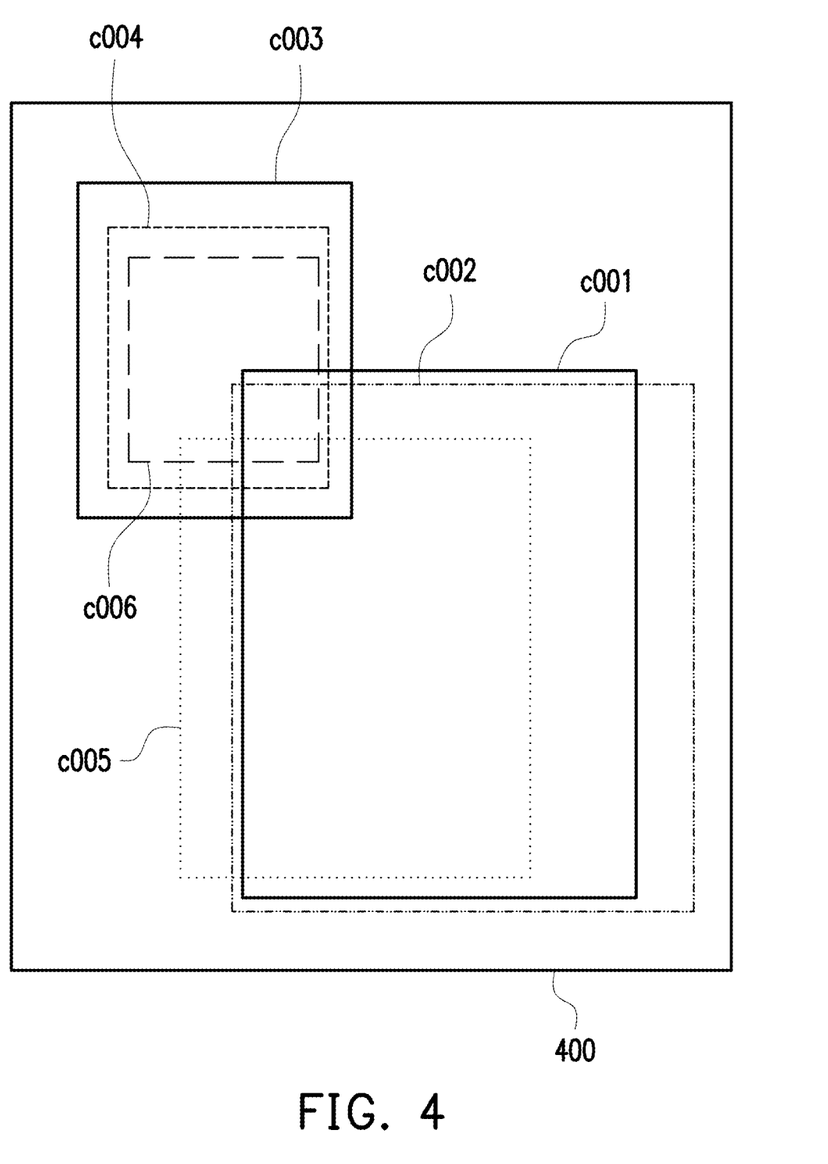
FIG. 4 is a schematic diagram of multiple candidate frames according to an embodiment of the disclosure.

FIG. 4 is a schematic diagram of multiple candidate frames according to an embodiment of the disclosure. A wafer inspection picture 400 shown in FIG. 4 detects 6 candidate frames, and the candidate frames are respectively candidate frames c001 to c006. Confidence indexes of the candidate frames c001 to c006 are respectively 0.95, 0.9, 0.9, 0.8, 0.7, and 0.7. First, the candidate frame c001 corresponding to the confidence index 0.95 is selected as a first marked frame. Here, it is assumed that an overlap rate of the candidate frame c002 and the first marked frame (the candidate frame c001) and an overlap rate of the candidate frame c005 and the first marked frame (the candidate frame c001) are greater than 60%. Hence, in the remaining five candidate frames, candidate frames whose overlap rates with the first marked frame (the candidate frame c001) are not greater than 60% are kept. That is, the candidate frames c003, c004, and c006 are kept.

Next, among the candidate frames c003, c004, and c006, the candidate frame c003 corresponding to the confidence index 0.9 is selected as a second marked frame. Here, an overlap rate of the candidate frame c004 and the second marked frame (the candidate frame c003) and an overlap rate of the candidate frame c006 and the second marked frame (the candidate frame c003) are greater than 60%. Hence, the candidate frame c004 and the candidate frame c006 are excluded, and no marked frame is further selected.

After the marked frame is confirmed, in step S210, the analysis device 120 calculates a gray scale index corresponding to the marked frame based on a gray scale value corresponding to each of pixels included in the marked frame. The gray scale index indicates a proportion of pixels whose gray scale values are greater than a specified value. For example, if the specified value is set to be 212.5, a proportion of a number of pixels whose gray scales are greater than 212.5 in the marked frame is calculated as the gray scale index.

Next, in step S215, based on the gray scale index, it is determined whether a trace pattern in the marked frame is a scratch or a grain boundary. For example, a threshold is set to determine whether the trace pattern is the scratch or the grain boundary.

Figure 5:
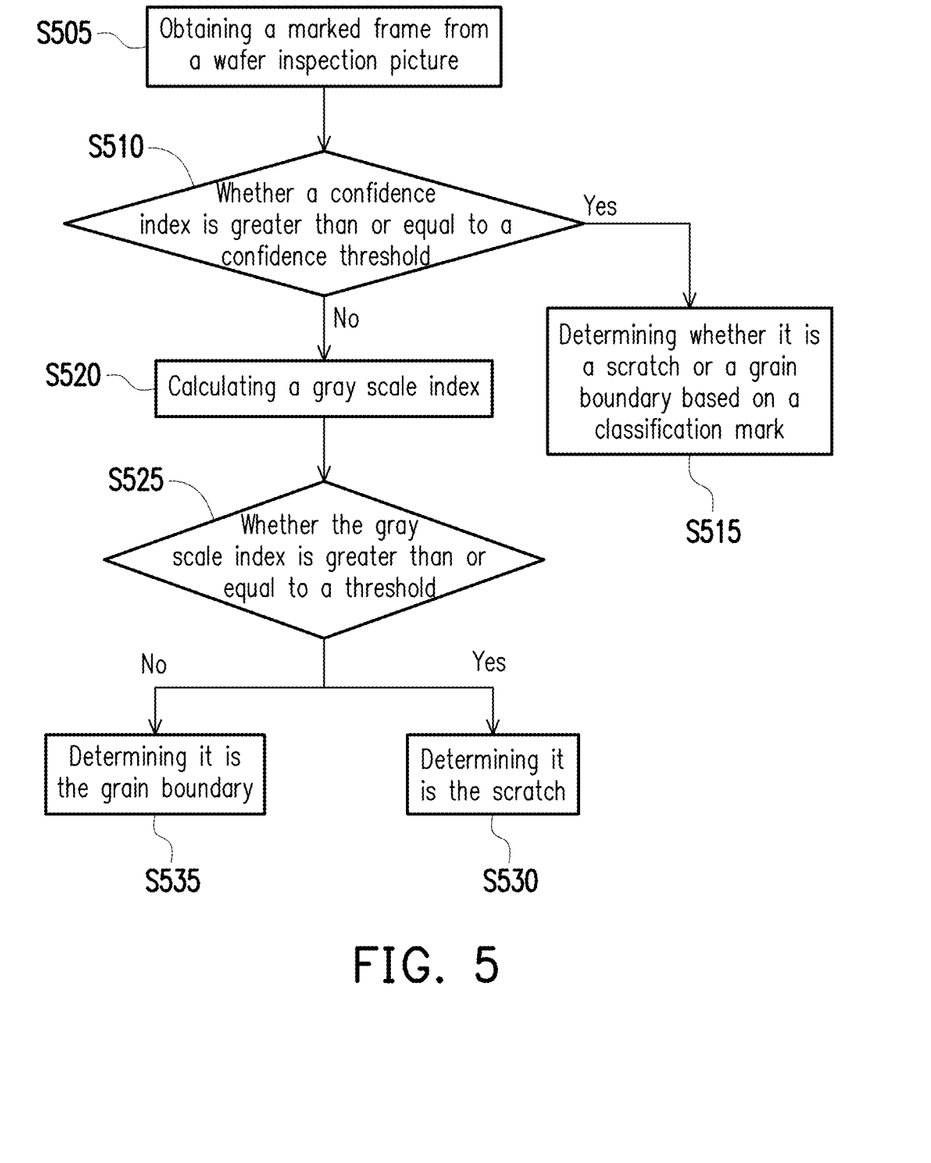
FIG. 5 is a flowchart of a method for distinguishing between a wafer scratch and a grain boundary according to an embodiment of the disclosure.

Below is another example. FIG. 5 is a flowchart of a method for distinguishing between a wafer scratch and a grain boundary according to an embodiment of the disclosure. In the embodiment, a confidence threshold may be set first for determination of a first stage, and the threshold is set for determination of a second stage. First, in step S505, the marked frame is obtained from the wafer inspection picture. Next, in step S510, it is determined whether the confidence index of the marked frame is greater than or equal to the confidence threshold. If the confidence index is greater than or equal to the confidence threshold, as shown in step S515, it is determined whether the trace pattern in the marked frame is the scratch or the grain boundary based on the classification mark.

For example, the classification mark M of the wafer inspection picture 300 shown in FIG. 3 is classified into two classifications, namely the scratch and the grain boundary. It is assumed that the classification mark M of the marked frame 310 of the wafer inspection picture 300 is the scratch. Since the confidence index C (99%) is greater than or equal to the confidence threshold (e.g. 70%), it means that a result of the model determination is correct. It is determined that a trace pattern in the marked frame 310 is the scratch based on the classification mark. Likewise, the determination of the first stage is based on the confidence threshold.

If the confidence index C is less than the confidence threshold, the classification mark M in the marked frame is not adopted for determination. Instead, further steps S520 to S535/S530 are executed.

That is, if the confidence index C is less than the confidence threshold, in step S520, the gray scale index is calculated. Specifically, the analysis device 120 calculates the gray scale index corresponding to the marked frame based on the gray scale value corresponding to each of the pixels included in the marked frame. The gray scale index indicates the proportion of the pixels whose gray scale values are greater than the specified value.

Figure 6A:
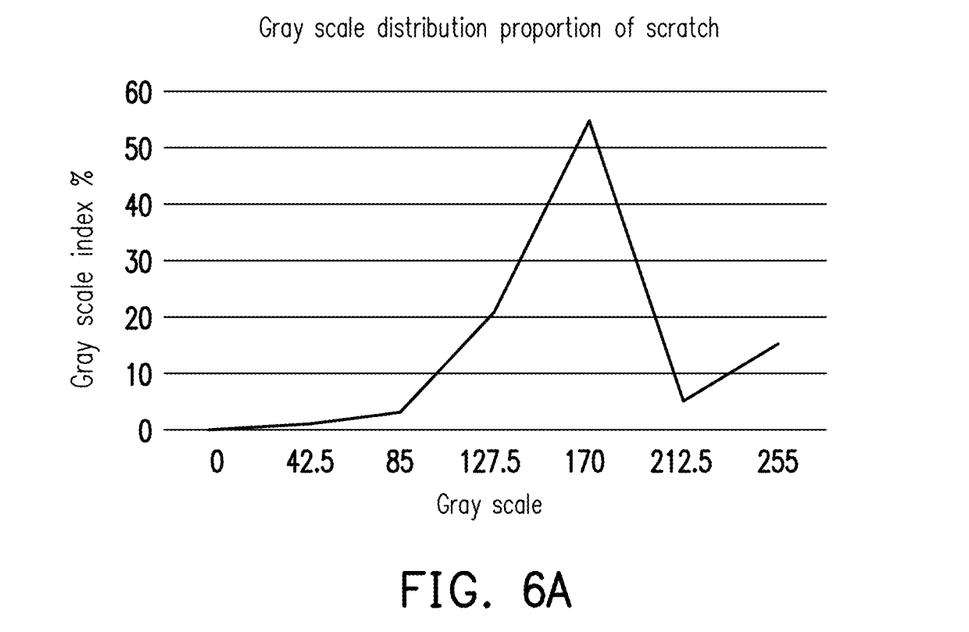
FIG. 6A and FIG. 6B are gray scale distribution curve charts according to an embodiment of the disclosure.
Figure 6B:
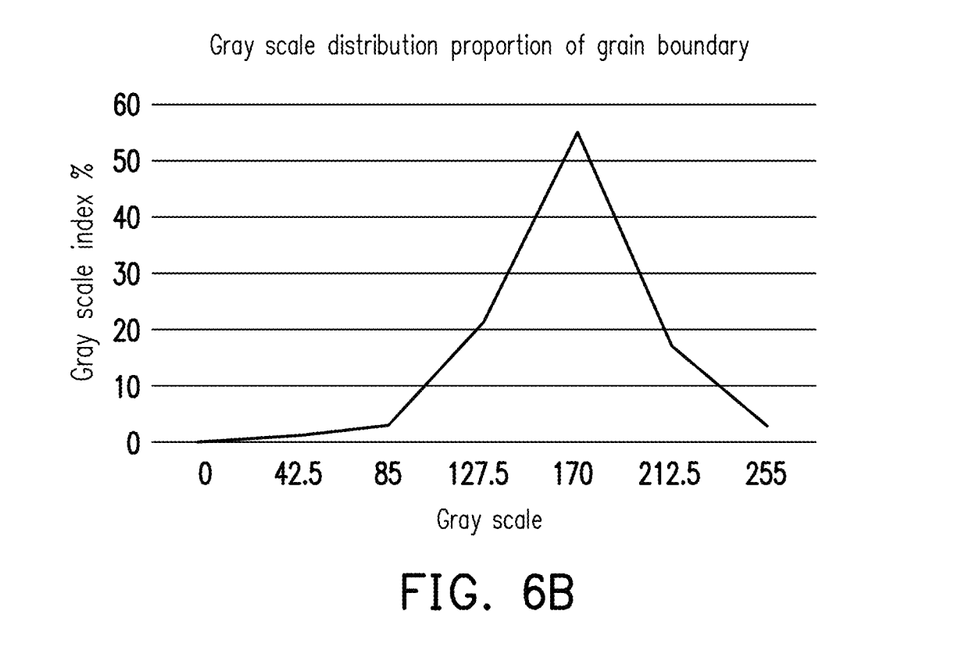

Specifically, FIG. 6A and FIG. 6B are gray scale distribution curve charts according to an embodiment of the disclosure. FIG. 6A is a gray scale distribution proportion of the scratch, and FIG. 6B is a gray scale distribution proportion of the grain boundary. Since scratches are generally distributed on a wafer surface layer, they are displayed white whose gray scale value is higher. Grain boundaries are not distributed on the wafer surface layer, so their gray scale values are lower. It is obtained from FIG. 6A and FIG. 6B that the proportion of the higher gray scale values of the gray scale index corresponding of the scratch, such as the proportion of the number of the pixels whose gray scales are greater than 212.5, is higher than that of the gray scale index corresponding to the grain boundary. Hence, in the embodiment as shown in FIG. 5, the specified value may be set to be 212.5 in advance to calculate the gray scale index.

Returning to FIG. 5, the threshold of the gray scale index is set. After the gray scale index is obtained, in step S525, it is determined whether the gray scale index is greater than or equal to the threshold. When the gray scale index is greater than or equal to the set threshold, in step S530, it is determined that the trace pattern in the marked frame is the scratch. When the gray scale index is less than the set threshold, in step S535, it is determined that the trace pattern in the marked frame is the grain boundary.

In another embodiment, after the determination of the first stage where the confidence index is used, a comprehensive index may be further calculated for the determination of the second stage. The process of FIG. 8 below is referred to for detailed description.

In a still another embodiment, three-stage determination may be performed. That is, the determination of the first stage is performed by using the confidence index. Next, the determination of the second stage is performed by using the gray scale index. Then, a comprehensive index is calculated for determination of a third stage. The process of FIG. 9 below is referred to for detailed description.

The comprehensive index is calculated based on the gray scale index and a slope difference index. The calculation of the slope difference index is specifically described below. After the analysis device 120 identifies the trace pattern in the marked frame, a first end point, a second end point, and multiple target points are extracted from the trace pattern. Next, a standard slope between the first end point and the second end point is calculated. Then, multiple comparison slopes are calculated based on two random points among the target points. Next, the slope difference index is obtained based on the standard slope and the comparison slopes. For example, the slope difference index is calculated with Equation (1) below. In Equation (1), n is a number of the comparison slopes, Si is an ith comparison slope, i=1~n, Set is the slope difference index, and Sstd is the standard slope.

$$Sct = \sum_{i=1}^{n} \frac{(Si - Sstd)/Sstd}{n} \quad (1)$$

An example is provided below to describe how to calculate the slope difference index.

Figure 7:
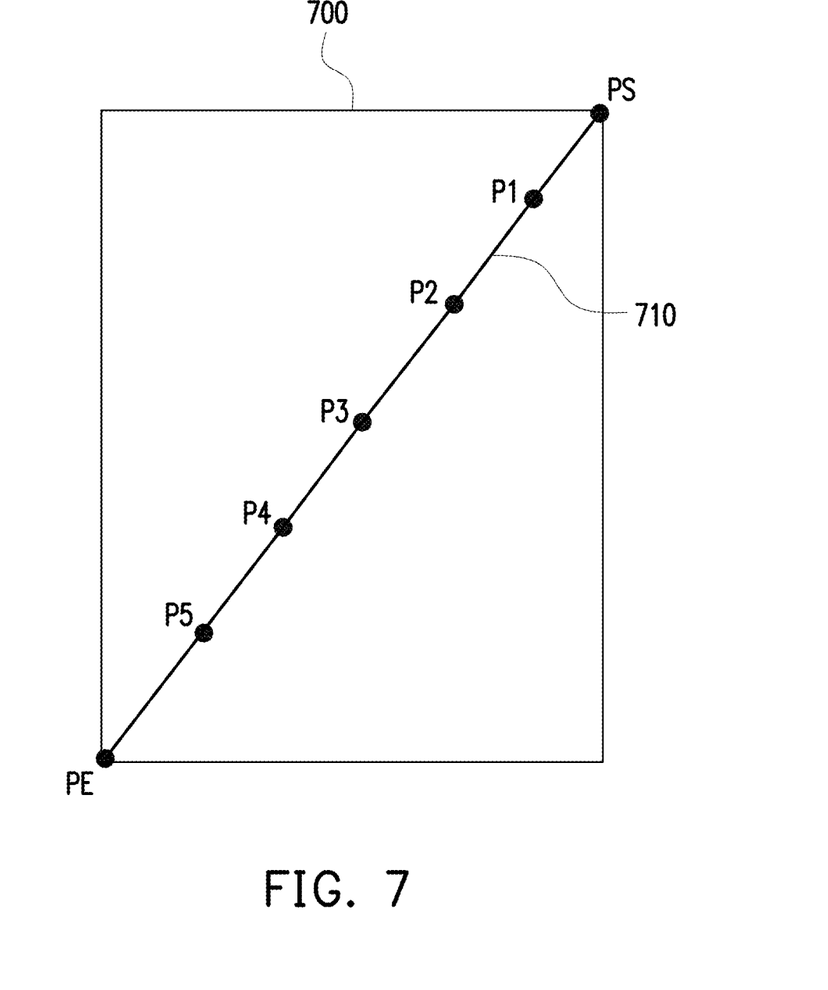
FIG. 7 is a schematic diagram of a trace pattern according to an embodiment of the disclosure.

FIG. 7 is a schematic diagram of a trace pattern 710 according to an embodiment of the disclosure. Referring to FIG. 7, a marked frame 700 includes the trace pattern 710. The analysis device 120 identifies the trace pattern 710 according to a gray scale value and obtains a coordinate (X_start, Y_start) of a first end point PS and a coordinate (X_end, Y_end) of a second end point PE of the trace pattern 710 at an edge of the marked frame 700. In addition, multiple target points P1 to P5 (X1, Y1) to (X5, Y5) are extracted from the trace pattern 710.

Next, a slope between the first end point PS and the second end point PE is calculated as the standard slope Sstd=(Y_start−Y_end)/(X_start−X_end). In addition, a slope between two random target points is calculated as the comparison slope. Here, slopes S1 to S4 of a target point P1 between target points P2 to P5 are respectively calculated. Slopes S5 to S7 of the target point P2 between the target points P3 to P5 are respectively calculated. Slopes S8 to S9 of the target point P3 between the target points P4 to P5 are respectively calculated. A slope S10 of the target point P4 between the target point P5 is calculated. The slopes S1 to S10 serve as the comparison slopes.

Next, the slope difference index Set is calculated with Equation (1).

$$Sct=[(S1-Sstd)/Sstd+(S2-Sstd)/Sstd+\ldots+(S9-Sstd)/Sstd+(S10-Sstd)/Sstd]/n \quad (1)$$

The comprehensive index may be obtained with Equation (2) below. C is the comprehensive index, G is the gray scale index, S is the slope difference index, and W1 and W2 are weight values.

$$C=W1\times G+W2\times(1/S) \quad (2)$$

Figure 8:
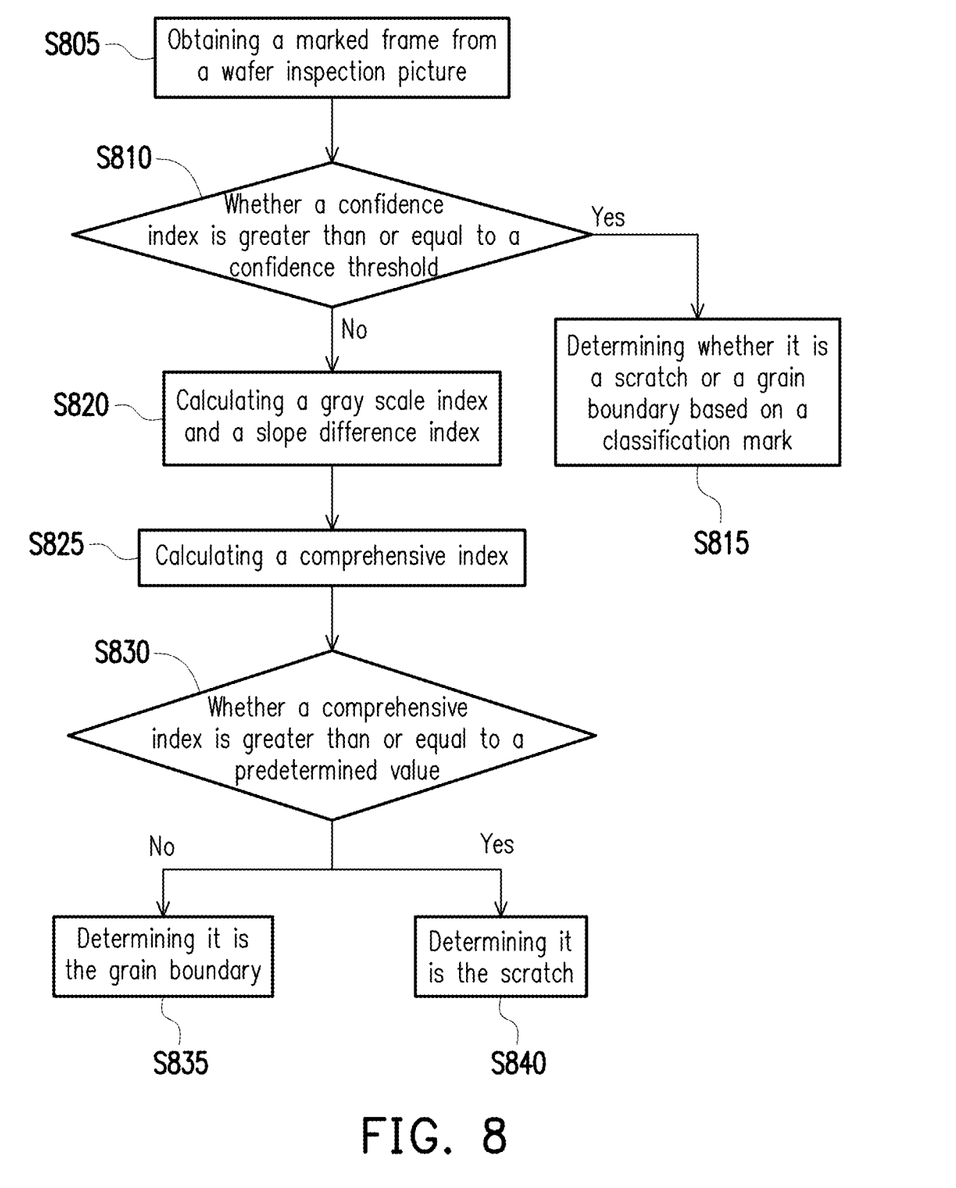
FIG. 8 is a flowchart of a method for distinguishing between a wafer scratch and a grain boundary according to an embodiment of the disclosure.

FIG. 8 is a flowchart of a method for distinguishing between a wafer scratch and a grain boundary according to an embodiment of the disclosure. In the embodiment, the confidence threshold is set first for the determination of the first stage, and a predetermined value is set in the second stage to be compared with the comprehensive index. Steps S805 to S815 of the embodiment are similar to steps S505 to S515 of FIG. 5. Relevant details are not repeated here.

That is, if the confidence index is less than the confidence threshold, in step S820, the analysis device 120 calculates the gray scale index and the slope difference index. For the calculation of the gray scale index, step S520 of FIG. 5 may be referred to. For the calculation of the slope difference index, Equation (1) above may be referred to. That is, in step S825, the analysis device 120 calculates the comprehensive index based on the gray scale index and the slope difference index. For the calculation of the comprehensive index, Equation (2) above may be referred to.

After the comprehensive index is obtained, in step S830, the analysis device 120 determines whether the comprehensive index is greater than or equal to the predetermined value. If the comprehensive index is greater than or equal to the predetermined value, in step S840, it is determined that the trace pattern in the marked frame is the scratch. If the comprehensive index is less than the predetermined value, in step S835, it is determined that the trace pattern in the marked frame is the grain boundary.

Figure 9:
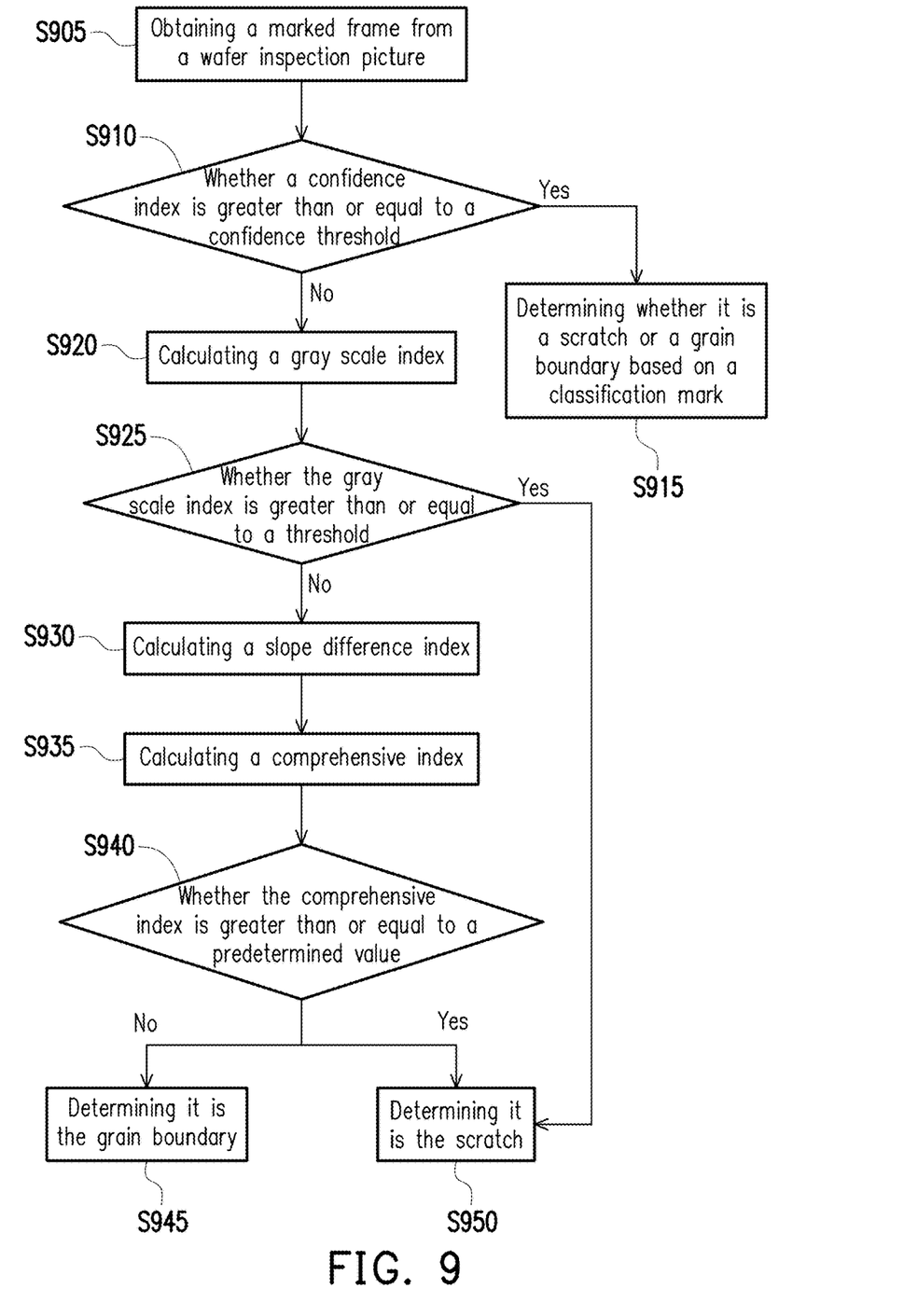
FIG. 9 is a flowchart of a method for distinguishing between a wafer scratch and a grain boundary according to an embodiment of the disclosure.

FIG. 9 is a flowchart of a method for distinguishing between a wafer scratch and a grain boundary according to an embodiment of the disclosure. In the embodiment, the three-stage determination is performed. That is, the confidence threshold is set for the determination of the first stage. Next, the threshold is set to be compared with the gray scale index in the second stage. Then, the predetermined value is set to be compared with the comprehensive value in the third stage. Steps S905 to S915 of the embodiment are similar to steps S505 to S515 of FIG. 5, and steps S920 to S925 are similar to steps S520 to S525 of FIG. 5. Relevant details are not repeated here.

In the embodiment of FIG. 9, when the gray scale index is greater than or equal to the set threshold, in step S950, it is determined that the trace pattern is the scratch. When the gray scale index is less than the set threshold, the determination of the third stage is performed. That is, in step S930, the slope difference index is calculated. The analysis device 120 identifies the trace pattern in the marked frame and calculates the slope difference index of the trace pattern by using Equation (1). Next, in step S935, the analysis device 120 calculates the comprehensive index. For example, the comprehensive index is calculated with Equation (2).

After the comprehensive index is obtained, in step S940, the analysis device 120 determines whether the comprehensive index is greater than or equal to the predetermined value. If the comprehensive index is greater than or equal to the predetermined value, in step S950, the analysis device 120 determines that the trace pattern in the marked frame is the scratch. If the comprehensive index is less than the predetermined value, in step S945, the analysis device 120 determines that the trace pattern in the marked frame is the grain boundary.

Specifically, a method for setting the set values, such as the confidence threshold, the predetermined value, the specified value, and the threshold, may include, for example, the following. Multiple inspection pictures and actual corresponding data are provided. After the inspection pictures are input into the analysis device 120 to train the model determination, an accuracy rate is calculated by comparing a training result of the model determination and the actual data. A suitable accuracy rate meeting requirements and corresponding values are adopted as the set values, such as the confidence threshold or the predetermined value. For example, setting of the threshold of the gray scale index is described below. For example, when the set threshold is equal to 15%, the accuracy rate is 90%, and when the set threshold is less than or greater than 15%, the accuracy is 60%. The accuracy rate of 60% does not meet requirements of the determination model, while the accuracy rate of 90% meets the requirements of the determination model. Hence, the threshold of the determination model is set to be 15%. The method may be applied to the confidence threshold, the predetermined value, the specified value, the threshold, the weight values, or any values that need to be set in advance. However, the example is only used for description. The values may be set according to different designs and requirements, and the disclosure is not limited thereto.

Figure 10:
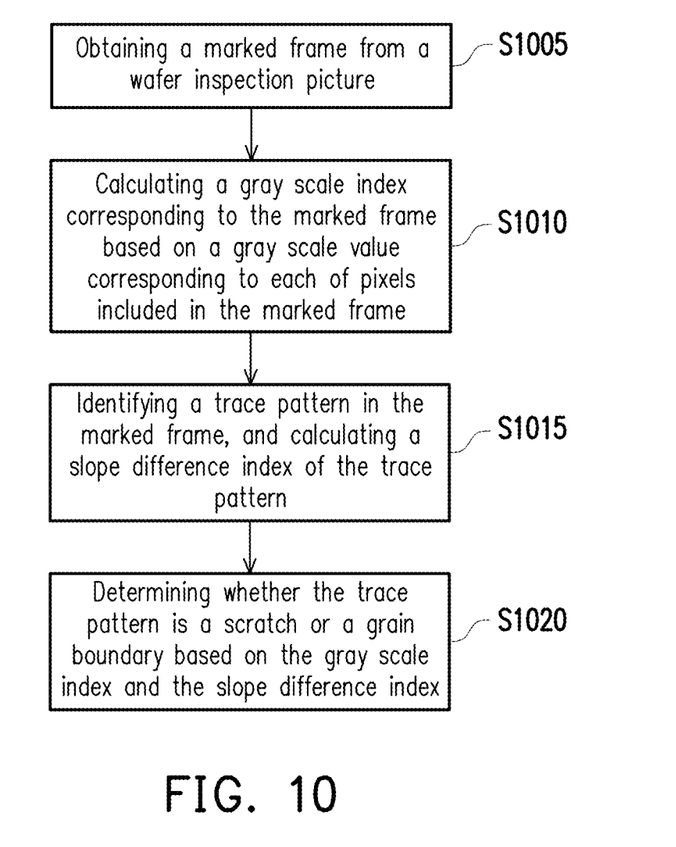
FIG. 10 is a flowchart of a method for distinguishing between a wafer scratch and a grain boundary according to an embodiment of the disclosure.

FIG. 10 is a flowchart of a method for distinguishing between a wafer scratch and a grain boundary according to an embodiment of the disclosure. In the embodiment, the determination is performed based on the gray scale index and the slope difference index. Referring to FIG. 10, in step S1005, the marked frame is obtained from the wafer inspection picture. In step S1010, the gray scale index corresponding to the marked frame is calculated based on the gray scale value corresponding to each of the pixels included in the marked frame. The gray scale index indicates the proportion of the pixels whose gray scale values are greater than the specified value. For the calculation of the gray scale index, step S520 of FIG. 5 may be referred to. In addition, in step S1015, the trace pattern in the marked frame is identified, and the slope difference index of the trace pattern is calculated. For the calculation of the slope difference index, Equation (1) above may be referred to.

Next, in step S1020, it is determined whether the trace pattern is the scratch or the grain boundary based on the gray scale index and the slope difference index. For example, the comprehensive index may be obtained based on Equation (2), and the predetermined value is set. If the comprehensive index is greater than or equal to the predetermined value, it is determined that the trace pattern in the marked frame is the scratch. If the comprehensive index is less than the predetermined value, it is determined that the trace pattern in the marked frame is the grain boundary. It is worth noting that, an order of steps S1010 and S1015 may be adjusted according to requirements or steps S1010 and S1015 may be completed in one process, and the disclosure is not limited thereto.

In summary of the above, in the disclosure, different characteristics of the grain boundary and the scratch are adopted to build an identification module, which can accurately distinguish between the grain boundary and the scratch, thereby reducing the chances of mistaking the grain boundary for the scratch and causing additional rework.

What is claimed is:

1. A method for identifying a wafer, the method comprising:
    obtaining a marked frame from a wafer inspection picture, wherein the marked frame comprises a plurality of pixels and a trace pattern;
    calculating a gray scale index corresponding to the marked frame based on a gray scale value corresponding to each of the plurality of pixels included in the marked frame, wherein the gray scale index indicates a proportion of pixels whose gray scale values are greater than a specified value;
    determining whether the gray scale index is greater than or equal to a threshold;
    in response to the gray scale index being greater than or equal to the threshold, determining that the trace pattern in the marked frame is a scratch; and
    in response to the gray scale index being less than the threshold, determining whether the trace pattern in the marked frame is a grain boundary.

2. The method for identifying the wafer according to claim 1, wherein the marked frame has a corresponding confidence index and a classification mark, wherein the classification mark comprises the scratch and the grain boundary, and after obtaining the marked frame from the wafer inspection picture, the method further comprises:
    in response to the confidence index being greater than or equal to a confidence threshold, determining that the classification mark is correct; and
    in response to the confidence index being less than the confidence threshold, determining whether the gray scale index is greater than or equal to the threshold after calculating the gray scale index.

3. The method for identifying the wafer according to claim 2, wherein determining whether the trace pattern is the grain boundary comprises:
    identifying the trace pattern in the marked frame and calculating a slope difference index of the trace pattern; and
    determining whether the trace pattern is the scratch or the grain boundary based on the gray scale index and the slope difference index.

4. The method for identifying the wafer according to claim 3, wherein calculating the slope difference index of the trace pattern comprises:
    extracting a first end point, a second end point, and a plurality of target points from the trace pattern;
    calculating a standard slope between the first end point and the second end point;
    calculating a plurality of comparison slopes based on two random points among the target points; and
    obtaining the slope difference index based on the standard slope and the comparison slopes.

5. The method for identifying the wafer according to claim 4, wherein obtaining the slope difference index based on the standard slope and the comparison slopes comprises:
    calculating the slope difference index with an equation below:

$$Sct = \sum_{i=1}^{n} \frac{(Si - Sstd)/Sstd}{n},$$

wherein n is a number of the comparison slopes, Si is an ith comparison slope, i=1~n, is the slope difference index, and Sstd is the standard slope.

6. The method for identifying the wafer according to claim 3, wherein determining whether the trace pattern is the scratch or the grain boundary based on the gray scale index and the slope difference index comprises:
    obtaining a comprehensive index based on the gray scale index and the slope difference index;
    in response to the comprehensive index being greater than or equal to a predetermined value, determining that the trace pattern in the marked frame is the scratch; and
    in response to the comprehensive index being less than the predetermined value, determining that the trace pattern in the marked frame is the grain boundary.

7. The method for identifying the wafer according to claim 6, wherein the comprehensive index is obtained through an equation below:

$$C = W1 \times G + W2 \times (1/S),$$

wherein C is the comprehensive index, G is the gray scale index, S is the slope difference index, and W1 and W2 are weight values.

8. A method for identifying a wafer, the method comprising:
    obtaining a marked frame from a wafer inspection picture;
    calculating a gray scale index corresponding to the marked frame based on a gray scale value corresponding to each of a plurality of pixels included in the marked frame, wherein the gray scale index indicates a proportion of pixels whose gray scale values are greater than a specified value;
    identifying a trace pattern in the marked frame and calculating a slope difference index of the trace pattern;
    calculating a comprehensive index based on the gray scale index and the slope difference index;
    determining whether the comprehensive index is greater than or equal to a predetermined value;
    in response to the comprehensive index being greater than or equal to the predetermined value, determining that the trace pattern is a scratch; and
    in response to the comprehensive index being less than the predetermined value, determining that the trace pattern is a grain boundary.

9. The method for identifying the wafer according to claim 8, wherein the marked frame has a corresponding confidence index and a classification mark, wherein the classification mark comprises the scratch and the grain boundary, and after obtaining the marked frame from the wafer inspection picture, the method further comprises:
    in response to the confidence index being greater than or equal to a confidence threshold, determining that the classification mark is correct; and in response to the confidence index being less than the confidence threshold, determining whether the comprehensive index is greater than or equal to the predetermined value after calculating the gray scale index, identifying a trace pattern, calculating the slope difference index and calculating the comprehensive index.

10. The method for identifying the wafer according to claim 9, wherein obtaining the slope difference index based on the standard slope and the comparison slopes comprises:
calculating the slope difference index with an equation below:

$$Sct = \sum_{i=1}^{n} \frac{(Si - Sstd)/Sstd}{n},$$

wherein n is a number of the comparison slopes, Si is an ith comparison slope, i=1~n, Sct is the slope difference index, and Sstd is the standard slope.

11. The method for identifying the wafer according to claim 8, wherein calculating the slope difference index of the trace pattern comprises:
extracting a first end point, a second end point, and a plurality of target points from the trace pattern;
calculating a standard slope between the first end point and the second end point;
calculating a plurality of comparison slopes based on two random points among the target points; and
obtaining the slope difference index based on the standard slope and the comparison slopes.

12. The method for identifying the wafer according to claim 8, wherein the comprehensive index is obtained through an equation below:

$$C = W1 \times G + W2 \times (1/S),$$

wherein C is the comprehensive index, G is the gray scale index, S is the slope difference index, and W1 and W2 are weight values.

* * * * *